(12) United States Patent
Maren et al.

(10) Patent No.: US 7,333,997 B2
(45) Date of Patent: Feb. 19, 2008

(54) KNOWLEDGE DISCOVERY METHOD WITH UTILITY FUNCTIONS AND FEEDBACK LOOPS

(75) Inventors: Alianna J. Maren, Woodbridge, VA (US); Stanley V. Campbell, Fairfaxd, VA (US)

(73) Assignee: Viziant Corporation, McLean, VA (US)

( * ) Notice: Subject to any disclaimer, the term of this patent is extended or adjusted under 35 U.S.C. 154(b) by 346 days.

(21) Appl. No.: 10/604,705

(22) Filed: Aug. 12, 2003

(65) Prior Publication Data

US 2005/0038805 A1   Feb. 17, 2005

(51) Int. Cl.
G06F 17/30 (2006.01)
(52) U.S. Cl. .............................. 707/101; 707/6; 706/45
(58) Field of Classification Search .................... 707/1, 707/5–6, 10, 100–101; 706/45
See application file for complete search history.

(56) References Cited

U.S. PATENT DOCUMENTS

| | | | |
|---|---|---|---|
| 4,874,963 A | 10/1989 | Alspector | |
| 5,383,120 A * | 1/1995 | Zernik | 704/10 |
| 5,444,819 A | 8/1995 | Negishi | |
| 5,461,699 A | 10/1995 | Arbabi et al. | |
| 5,589,622 A | 12/1996 | Gurr et al. | |
| 5,721,910 A * | 2/1998 | Unger et al. | 707/100 |
| 5,761,442 A | 6/1998 | Barr et al. | |
| 5,867,799 A | 2/1999 | Lang et al. | |
| 5,933,818 A | 8/1999 | Kasravi | 706/12 |
| 6,112,194 A | 8/2000 | Bigus | |
| 6,300,957 B1 | 10/2001 | Rao et al. | |
| 6,377,259 B1 | 4/2002 | Tenev et al. | |
| 6,411,962 B1 * | 6/2002 | Kupiec | 707/102 |
| 6,463,433 B1 | 10/2002 | Baclawski | |
| 6,529,603 B1 | 3/2003 | Palmer | |
| 6,578,022 B1 | 6/2003 | Foulger et al. | |
| 6,611,841 B1 | 8/2003 | Han | |
| 6,628,312 B1 | 9/2003 | Rao et al. | |
| 6,654,761 B2 | 11/2003 | Tenev et al. | |
| 6,665,681 B1 | 12/2003 | Vogel | |
| 6,668,256 B1 | 12/2003 | Lynch | |

(Continued)

FOREIGN PATENT DOCUMENTS

EP   1 107 157 A2   6/2001

OTHER PUBLICATIONS

Y. Seo and B. Zhang, "Personalized web-document filtering using reinforcement learning," Applied Artificial Intelligence, 2001.*

(Continued)

*Primary Examiner*—Khanh B. Pham
(74) *Attorney, Agent, or Firm*—Paul, Hastings, Janofsky & Walker LLP

(57) ABSTRACT

A knowledge discovery apparatus and method that extracts both specifically desired as well as pertinent and relevant information to query from a corpus of multiple elements that can be structured, unstructured, and/or semi-structured, along with imagery, video, speech, and other forms of data representation, to generate a set of outputs with a confidence metric-applied to the match of the output against the query. The invented apparatus includes a multi-level architecture, along with one or more feedback loop(s) from any Level N to any lower Level so that a user can control the output of this knowledge discovery method via providing inputs to the utility function.

33 Claims, 3 Drawing Sheets

Knowledge Discovery Architecture

U.S. PATENT DOCUMENTS

| | | |
|---|---|---|
| 6,678,694 B1 * | 1/2004 | Zimmermann et al. ..... 707/102 |
| 6,978,274 B1 * | 12/2005 | Gallivan et al. ............ 707/102 |
| 2002/0007373 A1 * | 1/2002 | Blair et al. ................. 707/505 |
| 2003/0014428 A1 | 1/2003 | Mascarenhas |
| 2003/0128998 A1 | 7/2003 | Nishi |
| 2003/0163302 A1 | 8/2003 | Yin |
| 2003/0212675 A1 * | 11/2003 | Denesuk et al. ............... 707/5 |
| 2003/0220860 A1 | 11/2003 | Heytens et al. |
| 2004/0172378 A1 * | 9/2004 | Shanahan et al. .............. 707/1 |
| 2005/0071328 A1 | 3/2005 | Lawrence |
| 2005/0149494 A1 * | 7/2005 | Lindh et al. ................... 707/3 |
| 2005/0222989 A1 | 10/2005 | Haveliwala et al. |
| 2005/0240580 A1 | 10/2005 | Zamir et al. |

OTHER PUBLICATIONS

U.S. Appl. No. 10/877,776, filed Jun. 2004.

Van Zuylen, Catherine, Inxight White Paper: From Documents to Information: A New Model for Information Retrieval, Inxight Software, Inc., Oct. 2004, (18 pages).

Inxight White Paper: Inxight SmartDiscovery: Discover the True Value of Information, Inxight Software, Inc., Jun. 2003, (13 pages).

Inxight White Paper: Inxight SmartDiscovery Product Data Sheet: The Complete Solution for Enterprise Information Discovery, Inxight Software, Inc., (4 pages).

\* cited by examiner

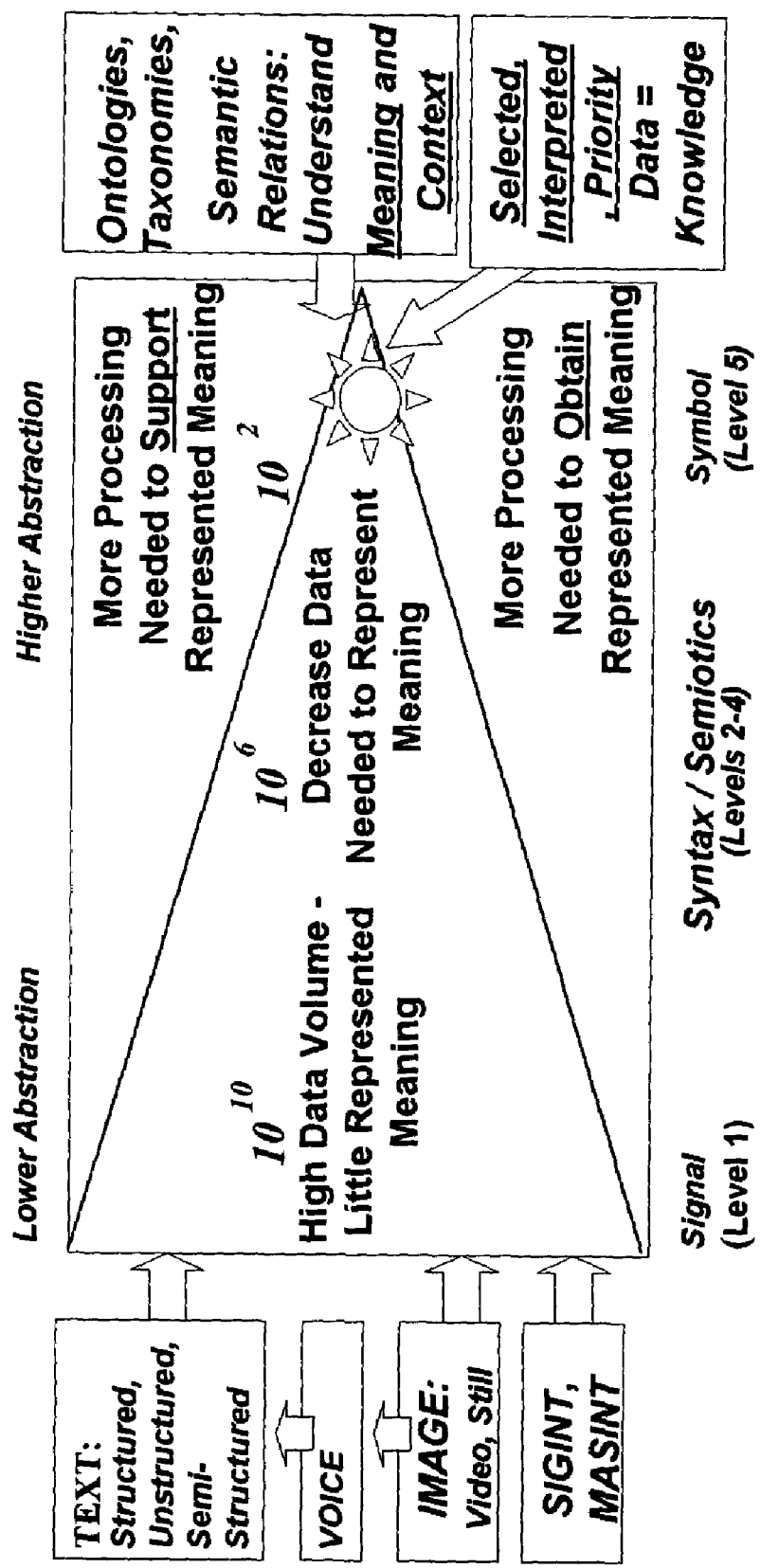
Fig 1: The Knowledge Discovery Challenge

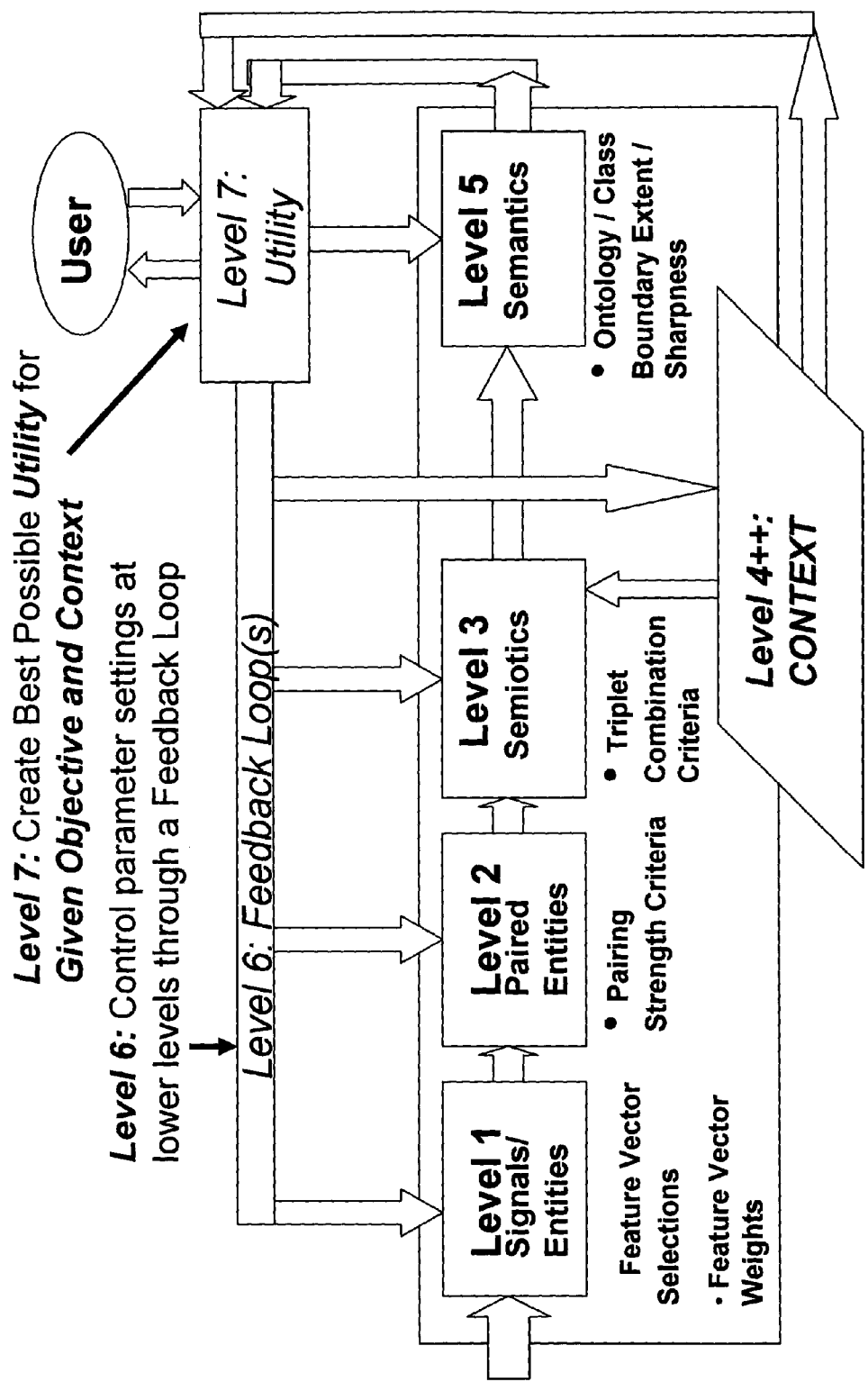
Fig 2: Knowledge Discovery Architecture

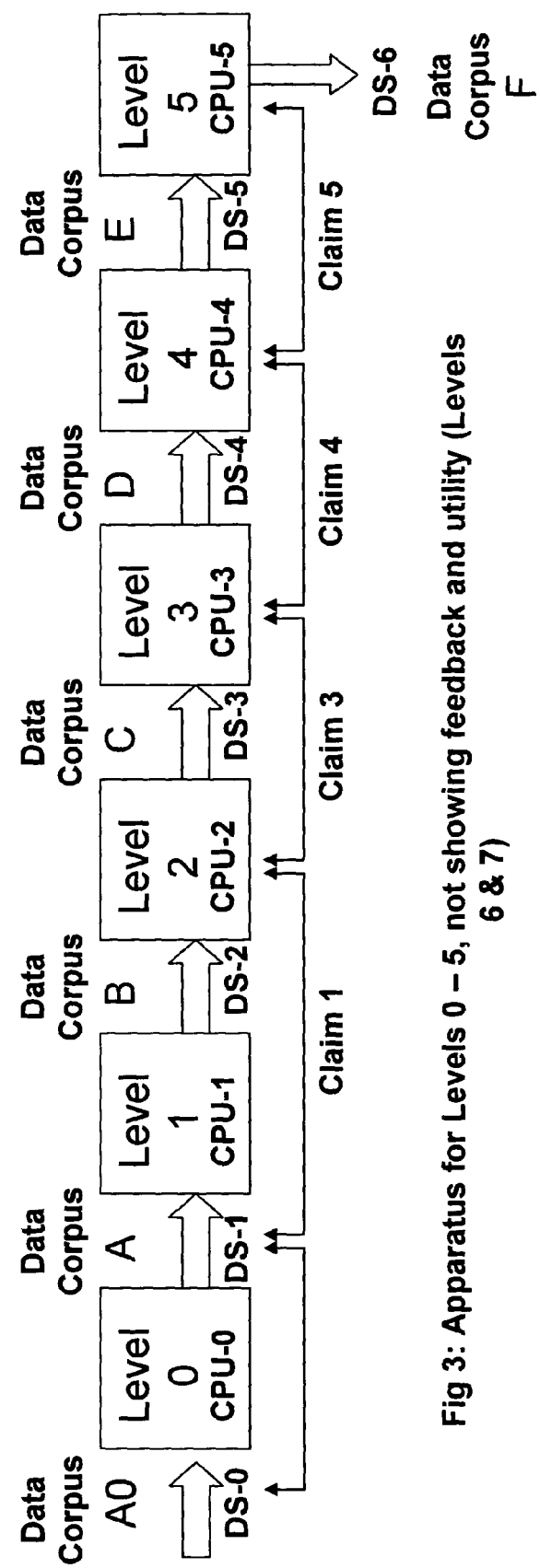
Fig 3: Apparatus for Levels 0 – 5, not showing feedback and utility (Levels 6 & 7)

KNOWLEDGE DISCOVERY METHOD WITH UTILITY FUNCTIONS AND FEEDBACK LOOPS

BACKGROUND

The invention is directed to an apparatus and method for performing knowledge discovery by extracting elements of information that are useable to an analyst with regard to an area of inquiry, whether or not that inquiry has been formally framed or the "inquiry" is generated by the apparatus in the course of automated processes.

There are many applications performing Knowledge Discovery (KD), ranging from Federal and Defense intelligence to business intelligence. Often, in such applications, many KD tools are used to perform specific steps in the KD process. More recently, various suites of such tools have been assembled to perform sequences of related KD operations. An example of such is the architecture adopted for the (2002) Joint Intelligence Virtual Architecture system. These systems are limited by the lack of either a Feedback Loop or a Utility Function modifying the Feedback Loop.

BRIEF DESCRIPTION OF THE DRAWINGS

FIG. 1 Illustrates the challenge of scalability, which shows how very large data corpora must be processed in order for to extract meaning relative to a given inquiry.

FIG. 2 is exemplary schematic views of the seven levels for a complete KD architecture includes five representation levels (1 through 5) and two control levels (6 and 7), in accordance with the invented method and apparatus. This figure shows the EagleForce "Representation Levels" concept, which is a foundation for building a knowledge discovery architecture. Levels 1 through 5 are detailed with Level 0 indexing (not shown) being reserved for the ingestion of extremely large data sets. Level 6 provides feedback control of lower levels, and Level 7 contains a utility function that is used to optimize feedback. This scalability serves to significantly enrich the metatagging process.

FIG. 3 is provides a schematic view of data flow through the apparatus, including the optional step 0, but not reflecting optional step 5c, beginning with the original data corpus and the transformation of the data corpus through the operations performed upon the data corpus.

DESCRIPTION

This invention overcomes the above-noted disadvantages. An apparatus in accordance with this invention is constructed to receive data feeds from one or more data sources, where the data feeds may include live and/or stored data, including "structured" (database) data, unstructured (e.g., document, web page), semi-structured (e.g., military Commander's Intent orders, militaryFrag(mentation) orders, or military or commercial email), along with audio, video, and/or image data. It is the intent of described metataggng methodology and apparatus to provide the highest and best use of the indexing, classification, and categorization of information resident within the collateral networks. The distinguishing feature of the methodology is the use of the "EF Feedback Loop", a process that incorporates the highest and best use of multiple COTS tools. The feedback loop is a widely accepted calibration concept, commonly deployed in this environment for elements of ranking algorithms, type weights, and type proximity-weights. The feedback loop is used in conjunction with one or more of the EF Utility Function(s). The purpose of the utility functions is to iteratively adjust the parameter controls sent back via the feedback loop process in order to maximize results according to a given benefit or utility.

The primary challenges associated with retrospective metadata tagging are:

1. Creating the right metadata "concept classes" that identify those corpus elements (e.g. documents, pages, paragraphs) containing inquiry-relevant concepts, and
2. Ensuring scalability. The issue of scalability compels us to use an architectural suite of integrated COTS tools as integral to the apparatus, along with the control mechanisms of feedback loops governed by utility functions. This is the only means by which metadata tagging can be retrospectively done, while still maintaining the ability to handle very large (e.g., order-of-terabyte, or $O(10^{12})$, sized corpora.

The scalability issue is dealt with by using an integrated COTS suite to reduce the manpower overhead and minimize the level of human interaction required to support the retrospective markup process, while still maintaining the quality of the metadata markup needed for precision searching.

The key issue in controlling scalability, and in reducing manpower overhead, is to determine correct parameter settings governing the metadata tagging process as well as information retrieval in response to metatag-based queries. This is undoubtedly the most significant challenge in the data analysis and metatagging process. One reason that this is so challenging is that when retrospective metadata tagging is introduced as an additional processing stage on top of preliminary data metatagging, the issues associated with corpus size and scalability are exacerbated. Thus, it is crucial to find a method by which metadata tagging can be done, both initially and retrospectively, in a manner that both makes precise inquiry possible and which allows scaling to very large corpora.

Google patent holders, Drs. Sergey Brin and Lawrence Page, who in their paper "The Anatomy of a Large-Scale Hypertextual Web Search Engine," state, "Figuring out the right values for these parameters is something of a black art", express the importance of this challenge.

Like most others, Drs. Brin and Page place the user as the initial and primary element(s) of the feedback loop. There, the "user may optionally evaluate all of the results that are returned." But it is precisely this positioning that becomes untenable as very large corpora are considered. This "Google" process, common among most COTS tagging and search products, has clearly achieved less than satisfactory results in the challenging intelligence data-parsing environment. Even user-oriented search training functions ultimately only serve to constrain results based on the limitations of a particular tool's mathematical capabilities.

To enhance this well-established query process into structured, unstructured, and semi-structured data, many in the Defense, Intelligence, and commercial environment have begun developing suites of tools that utilize different algorithms against the same data set. Two major issues evolve when using such suites:

1. Query results using these suites generally differ based on the order of the data flow.
2. The results are extremely inconsistent and become virtually unusable as the data corpora expand.

The latter issue of results inconsistency is directly related to the issue of scalability, which is a primary concern when dealing with retrospective metadata tagging. Generally, the metaschema between the tools is unique to the individual product and integration, even that which extends to the API level, allowing the individual tool to read and optimize its portion of the metadata. Knowledge is organized and presented in an extremely robust manner when the data corpora are small. However, as the size of the originating file expands, the discovery of relevant knowledge and entities/concepts to tag, suffers greatly.

The present invention minimizes the user interaction level required for precise searching by first defining a functional architecture in which different levels of knowledge representation and knowledge processing are used in successive manner. Both initial and retrospective metadata tagging are done at Level 1. Higher levels allow for different degrees of correlation among the data. When these correlations are done, it is possible to generate focused and pertinent retrospective metadata tagging directives. This is done partially through modifying the ranking function that guides metadata tagging. The modified ranking function is used to present the rank impact of the change on all previous searches.

Here the EF FeedBack Loop runs a Level 1 classifier tool at a very simple level as a first pass. This serves to focus on getting those documents that have the highest, richest data relative to the inquiry as we position our classifier to operate with a very tight sigma—i.e., a document has to have lots of hits on very simple, core keywords in order to be selected and moved forward. For this purpose, we use a Bayesian classifier with Shannon relevance ranking. The value of the EF Feedback Loop and the EF Utility function allows the use of multiple independent or collective Level 1 tools. The EF Feedback Loop and the EF Utility Function apparatus is employed to control the processing limits without affecting fidelity by disbursing the workflow to multiple reasoning parsers.

Once the initial Level 1 pass is complete, the EF Feedback Loop and Utility Function allow the user to set the number and/or relevance scale to the first order of Level 2. The system will automatically push the most relevant sources to Level 2 so as to allow that portion of the system to apply its independent "noun phrase" parsing and "co-occurrence" algorithms to the classification/categorization process. The Level 2 processor will then push only its new classification/categorization concepts back to level 1 for re-indexing. Following the second pass the EF FeedBack Loop and its associated Utility functions allows the second pass to Level 2 to take its most relevant data to Level 3 for its independent "verb" parsing algorithms. New concepts or classifications are passed back from Level 2 and to Level 1 for re-indexing and with results returned to Level 2. The EF Feedback Loop has now allowed 5 sets of algorithms to apply 3 independent sets of metadata markings that are all read in their entirety, in exactly the same fashion by the integrated system prior to the user seeing the first query result.

The EF Feedback Loop is controlled by a set of "Utility Functions" which are designed to support the centralization of information technology services that are of common concern to the Intelligence Community. This methodology employs the indexing schema in the same manner for structured and unstructured data, however we employ the specific use of structured data OLAP tools to address the EF FeedBack Loop independently from the noun phrase or verb parsing.

The method and apparatus consists of a tiered set of representation levels, herein described as five representation levels, along with an optional Level 0, together with the EF FeedBack Loop methodology and the EF Utility Function, which is designed to index, classify, and categorize data at eight levels of processing. The preferred embodiment is to employ a COTS-based architecture, making use of "best of the breed" existing and proven tools.

This embodiment has, in cooperation with several COTS vendors, developed and already demonstrated an integrated architecture with essential capabilities from Levels 1 through 4. he addition of the technology provided by a Level 5 capability will complete the basic suite. Note that within this architectural framework, there is typically more than one COTS capability. Within the overall architectural concept, it is possible to use a customer-preference for a specific COTS product within a given appropriate level, or to use more than one COTS capability, again within a given level.

The EF FeedBack Loop begins with the order of scalability assuming that the incoming data set is on the order of 1 terabyte. The first order of business is to determine the time interval (Day, Month) to provide a consistent measurement basis for evaluation. The approach allows the first order of indexing (identification of documents with key words) to be metatagged as they are found in the document without the generalization into classes, concepts, co-occurrence-, etc. This level is used as the heavy lift, which allows the system and not the user to initiate the definition process as to whether a document has any potential relevance whatsoever, or if it can just be tossed. The goal at Level 0 is to reduce the amount of data as much as possible, without losing anything potentially useful.

The preferred embodiment for this method and apparatus is based on a "Plug and Play" mindset. Thus, both the method and the apparatus are agnostic with respect to database vendor. A similar approach is employed throughout the architecture for the apparatus.

There are two different classes of interfaces within the architecture. The first, and generally more straightforward, is the passing of data and metadata between tools. This apparatus and method solves the associated interface problems between several different tools, usually by a combination of special interface code at the API level, and use of intelligence in tool-specific metadata. Additional tools can be integrated as necessary.

The second interface type involves passing of control between applications. This method and architecture has solved this via the EF Feedback Loop and the EF Utility Functions. The EF Feedback Loop has been described in the said claim (6). The EF Utility Functions are a set of measures of the value (utility) of an intermediate or final output to the end-user, and have been described in the said claim (7). Utility functions thus provide a metric by which a proposed feedback action can be measured, and the overall performance of the system improved. Multiple utility functions are typically required because there are several independent axes that may be used to determine effectiveness.

This method and apparatus provide multiple benefits to the end user. Since the architecture comprehends the value of common look and feel, the usual difficulties in switching from tool to tool are mitigated. As capability is added, an increasing number of queries can be formed in natural language (English). In addition to facilitating ease of use and productivity, both of these factors reduce the amount of training required to employ these capabilities. Addition of a vector-based geo-referencing capability will enable the user to "drill down" based on geospatial locality.

Advantageously, the invented apparatus and method can be used to preferentially extract relatively sparse concept classes and most especially various combinations of concept classes (where each "concept class" can be expressed as a category, a set of nouns and/or noun phrases, or a single noun or noun phrase, depending on the embodiment of the invention) along with identification of the relationships (single or multiple verbs, or verb sets) linking different concept classes. At the same time, the influence of "contextual" information can be incorporated to preferentially refine a given concept class, or to add more information relative to an area of inquiry. As an example, including geo-spatial references at Level 4 of the processing allows for "neighborhoods" surrounding a given occurrence to be preferentially tagged via feedback into the Level 1 process. Similarly, use of a Language Variant method at Level 4 can be used to identify geospatial regions of interest when a name of interest (found during Level 1 or Level 2 processing) is identified and then one or more Language Variants of that name are identified in Level 4. If occurrences of these proper name Language Variants are then found as a result of feedback into a lower level (e.g., Level 1), then the geospatially-referenced regions associated with the Language Variants provide context for later iterations of the feed forward process that begins at Level 1.

These together with other features and advantages, which will become subsequently apparent, reside in the details of construction and operation of the invented apparatus and method as more fully hereinafter described and claimed, reference being made to the accompanying drawing, forming a part hereof, wherein like numerals refer to like parts throughout the view.

An embodiment of the present invention includes a method comprising the steps of:

a) Performing Level 1: Indexing/Classification applied to data corpus "A", where "A" is a data corpus consisting of (typically) a large to very large number of members which can be structured, semi-structured, and/or unstructured text, the result(s) of any form of speech-to-text conversion, and/or images or other signal-processed data, and/or any combination of such data, where the Indexing/Classification process is performed specifically as: indexing and/or classifying the members of data corpus "A" by appending to each member one or more "metatags" descriptive of the content of that member, whether that content is explicitly referenced (e.g., via "indexing," using methods and terminology well known to practitioners of the art), or implicitly referenced using one or more of the various possible "classification" algorithms (e.g., Bayesian, or Bayesian augmented with "Shannon Information Theory" feature vector weighting), where the only specific requirement of the classification algorithm(s) at least one of the algorithm(s) employed be "controllable" through at least one parameter value (e.g., the "sigma" value in a Bayesian classifier, or more broadly, the "sigma" value, the number of elements in the prototyping "feature vector" for such a classifier, and the "feature vector element weights" applied to each element of a given "feature vector," where these terms and associated methods are all well known to practitioners of the art, and this specification of possible parameter types is by no means exhaustive), and the end result is the set of one or more "metatags" so produced by application of one or more classification algorithm(s) to a given data corpus element and then associated with that element are indicative of the content of each element; and additionally a document may be classified and/or metatagged as containing one or more concept classes whose existence is inferred through the presence of certain words (typically noted as feature vectors) in that document, b) Performing Level 1 to Level 2 Transition, by which a proper subset of members from the initial data corpus "A" are selected for Level 2 processing, which is done by selecting from among all the (optionally indexed and) metatagged members of data corpus "A" those whose metatags are a match to a set of criteria, where these criteria can be set either or both by the user of this method or by an automated process incorporated as part of this method, and whose exact specification does not in any way impact the generality of the method described here, and this subset is denoted data corpus "B", c) Performing Level 2 Pairwise Associative Processing, by which the data corpus "B" members selected during said step (b) are processed so as to produce "pairwise associations" between the elements of each of these members of "B", where a typical embodiment of this step would be to generate a set of pairwise associations of nouns and/or noun phrases extracted from a text-based corpus "B", although this method can be extended and applied to data corpora containing other types of elements (e.g. images, signals) without loss of meaning or generality, and where the associations are typically limited to those within a given member of "B", although the results of such associations are typically noted accumulatively across the entire corpus "B", and a typical embodiment of this step is a "pairwise co-occurrence matrix" applied to objects in each member of "B" whereby a corresponding matrix element is incremented whenever a given pair of nouns and/or noun phrases occurs within a set distance of each other, although any accumulative pairwise-association method applied across "B" may be used without loss of the generality or meaning of the knowledge discovery method being described herein.

According to another embodiment of the present invention, the method may include the optional steps of:

a) Performing Level 0: Optional Preprocessing/Indexing, specifically: (optionally) indexing the members of a data corpus "A0" by "tagging" each member of the corpus with one or more "metatags" in any such manner as is well known to practitioners of the art, whereby the "metatags" refer to specific identifiable elements (e.g., but not limited to, specific words, or specific content as might be found in an image) and where this step is typically reserved for very large data corpora (e.g., typically where the number of members of data corpus "A0" exceeds $O(10^6)$) but may be applied to any size corpus without loss of the validity or generality of this method;

b) Performing Level 0 to Level 1 Transition, specifically selecting those members of the data corpus whose "indices" as found and applied in said step (a) are a "match" to some specified criteria, whether these criteria are set manually by a user for a given knowledge discovery task or set via an automated process, and the method by which these "index matches" are selected is any one of those well known to practitioners of the art and detailed specification of such method or development of a new "indexing" method is not essential to specifying this knowledge discovery method, nor is it essential to specify the method by which such "indexed" data corpus members are "selected" for "Transition" to the predecessor step (1a) except that the general intention of said "selection" is to reduce the size of the "selected" sub-corpus, which we now denote corpus "A".

According to another embodiment of the present invention, the method may include the steps of:
a) Performing Level 2 to Level 3 Transition, by which the "pairwise associations" found in said step (1c) are filtered by any one or more of various algorithmic means well known to the practitioners of this art so as to extract a subset of associations by application of one or more selection criteria, and the generality and meaning of this method is not dependent upon the specific nature of these criteria, and where a typical embodiment of this method would be to use a cut-off process selecting only those "pairwise associations" that reach a certain predefined or preset value, whether this value is fixed or determined by an algorithmic means (such as histogramming or thresholding, or any such method as is employed by the community for similar purposes), and where extracted subset of these associations is hereafter referred to as data corpus "C" and is passed to a subsequent "Level 3" for further processing,
b) Performing Level 3 Syntactic Associative Processing, by which the data corpus "C" members selected during said step (3a) are processed so as to produce "syntactic associations" between the elements of one or more of each of these members of "C", where a typical embodiment of this step would be to generate a set of subject noun-verb-object noun associations using nouns and/or noun phrases extracted from the data corpus "C" as subject nouns (and potentially also as object nouns) and the verbs and additional object nouns are drawn from the data sources from which data corpus "B" was extracted, although this method can also include simple subject noun-verb associations and also verb-object noun associations, and where the identifications of subject nouns, object nouns, noun phrases, concept classes, and verbs, are those common to practitioners of the art, and the resulting representation of the syntactically-associated may be either in structured (e.g., database) or other form, so long as the syntactic relationship between the associated words or phrases is represented, and may also include, without loss of generality or meaning of this method, additional grammatical annotations to the basic syntactic representation (e.g., adjectives, etc.) and any one or more noun and/or noun phrase may be replaced with an associated "concept class," using methods that are the same or similar to those described in (1a).

In yet another alternative embodiment of the present invention, the may includes the steps of:
a) Performing Level 3 to Level 4 Transition, by which the "syntactic associations" found in said step (3b) are filtered by any one or more of various algorithmic means well known to the practitioners of this art so as to extract a subset of associations by application of one or more selection criteria, and the generality and meaning of this method is not dependent upon the specific nature of these criteria, and this subset denoted as data corpus "D" is passed to Level 4 for further processing,
b) Performing Level 4 Context-Based Processing, by which the data corpus "D" members selected during said step (4a) are processed so as to produce "context associations" using one or more of a variety of methods, which may be applied to either or both the elements of data corpus "D" or to additional databases and/or knowledge sources, such as are known to practitioners of the art, so as to extract refinement of both associations and concept classes as was described in said step (1a).

The method may also include the steps of:
a) Performing Level 4 to Level 5 Transition, by which the "context associations" and/or context refinements found in said step (4b) are filtered by any one or more of various algorithmic means well known to the practitioners of this art so as to extract a subset of associations by application of one or more selection criteria, and the generality and meaning of this method is not dependent upon the specific nature of these criteria, and this subset denoted as data corpus "E" is passed to Level 5 for further processing,
b) Performing Level 5 Semantic-Based Processing, by which the data corpus "E" members selected during said step (5a) are processed so as to produce "semantic associations" and "semantic meaning and/or interpretation" using one or more of a variety of methods, such as are known to practitioners of the art, so as to extract further refinement of associations as was described in said steps (2b, 3b, and 4b), concept classes as was described in said step (1a), and additionally any knowledge-based and/or semantic-based information that can be associated with the elements of data corpus "E",
c) (Optionally) perform steps 5a and 5b as many times as necessary with defined processing unique to each step 5c and different from any previous step to define the apparatus to the number of levels desired.

According to yet another alternative of the present invention, the above mentioned methods may also include the step of: performing Level N to Level (N-X) Feedback Control, where "N" errors to any of Levels 2 through 5, and "X" may take on any value from (1, . . . , N-1) inclusive, by which one or more of the parameters governing any of the processes as described above are controlled by the feedback loop operating on outputs computed at Level N, where N>the controlled level (1, 2, 3, or 4), and where multiple feedback loops can be implemented in any given instantiation of this method.

According to another alternative embodiment, the method may also include the step of: performing a Utility Function computation and output, by which the "Feedback Loop" as described in said step (6) is modulated and controlled by means of a function so as to give either or both the user and/or an automated process the ability to control and "tune" the feedback loop so as to bring the overall system results to a desired level of performance, and where the formulation of said "Utility Function" follows he rules of practice as are well understood by practitioners of the art.

The embodiments of the present invention also include an apparatus for use with the processes described above and including: one or more data access and/or storage unit(s) "DS-1" coupled to receive and store as needed the data corpus "A", one or more computational processing unit(s) "CPU-1" coupled o receive the data corpus "A" and perform the processing as indicated in claim 1 "Level 1" processing, one or more data storage unit(s) "DS-2" coupled to the computational processing unit "CPU-1" so as to receive and store the data corpus "B" that is generated as an output of the process described above as "Level 1" processing.

The apparatus may also include one or more computational processing unit(s) "CPU-2" coupled to receive the data corpus "B" from "DS-2" and perform the processing described above as "Level 2" processing.

Furthermore, the apparatus may also include one or more data storage unit(s) "DS-3" coupled to the computational processing unit "CPU-2" so as to receive and store the data corpus "C" that is generated as an output of the process described above as "Level 2" processing.

The apparatus may also include a visualization and/or display unit or other means of providing viewing and/or results interpretation of either or both Level 1 and/or Level 2 processing, and/or making these results available to another process, whether automated and/or semi-automated.

According to yet another embodiment the apparatus, may one or more data access and/or storage unit(s) "DS-0" coupled to receive and store as needed the data corpus "A0", from stored and/or live data feeds, one or more computational processing unit(s) "CPU-0" coupled to receive the data corpus "A0" and perform the processing as indicated in claim 2 "Level 0" processing, and is for that purpose coupled to "DS-1" so that the outputs of the Level 0processing can be stored and made available for Step (1).

Alternatively, a visualization and/or display unit or other means of providing viewing and/or results interpretation of Level 0 processing, and/or making these results available to another process, whether automated and/or semi-automated may be provided.

When the apparatus employs Level 3 processing the apparatus may include one or more computational processing unit(s) "CPU-3" coupled to receive the data corpus "C" from "DS-3" and perform the processing as indicated in claim 3 "Level 3" processing, one or more data storage unit(s) "DS-4" coupled to the computational processing unit "CPU-3" so as to receive and store the data corpus "D" that is generated as an output of the process described above as "Level 3" processing. In addition, the apparatus may include one or more visualization and/or display unit(s) or other means of providing viewing and/ or results interpretation of Level 3 processing, and/or making these results available to another process, whether automated and/or semi-automated.

According to another alternative embodiment of the present invention, when context based processing of level 4 is provided the apparatus may include one or more computational processing unit(s) "CPU-4" coupled to receive the data corpus "D" and perform the "Level 4" processing, and if more than one unit is so used, then appropriate coupling exists so as to transfer results between the processes as is necessary, one or more data storage unit(s) "DS-5" coupled to the computational processing unit "CPU-4" so as to receive and store the data corpus "E" thatis generated as an output of the process described in said claim 4 "Level 4" processing.

Furthermore, the apparatus may optionally include one or more visualization and/or display unit(s) or other means of providing viewing and/or results interpretation of Level 4 processing, and/or making these results available to another process, whether automated and/or semi-automated.

According to yet another alternative embodiment of the present invention, the apparatus may include one or more computational processing unit(s) "CPU-5" coupled to receive the data corpus "E" and perform the processing as indicated in claim 5 "Level 5" processing, one or more data storage unit(s) "DS-6" coupled to the computational processing unit "CPU-5" so as to receive and store the data corpus "F" that is generated as an output of the process described above as "Level 5" processing.

Furthermore, the apparatus may include a visualization and/or display unit or other means of providing viewing and/or results interpretation of Level 5 processing, and/or making these results available to another process, whether automated and/or semi-automated, According to an exemplary embodiment of the present invention, an apparatus which additionally contains one or more computational and data storage units wherein the one or more "Feedback Loop(s)" as described above with regard ot step (6) are computed and stored is provided. The CPU and storage units are coupled to the appropriate Level N and Level (N-X) computational (CPU) units, (optionally) a visualization and/or display unit or other means of providing viewing and/or results interpretation of Feedback Loop processing, and/or making these results available to another process, whether automated and/or semi-automated, The embodiments of the present invention also includes an apparatus which additionally contains one or more units wherein the one or more "Utility Function(s)" as described in said step (7) are computed, and which is (are) coupled to the appropriate "Feedback Loop" computational (CPU) units.

A visualization and/or display unit or other means of providing viewing and/or results interpretation of the one or more Utility Function(s), and/or making these results available to another process, whether automated and/or semi-automated may optionally be provided.

According to another embodiment of the invention, the various units described in paragraphs above may be combined as appropriate for the purpose of enabling the processing and storage requirements.

According to exemplary embodiments of the present invention, the apparatus described above may include, wherein one or more of the various units and the processes which are supported by each unit or appropriate combination of data storage and computational processing units, is embodied as an existing tool, whether available as a research prototype or "commercial-off-the-shelf" implementation.

The invention claimed is:

1. A method for performing knowledge discovery comprising the steps of:
   associating with each member of a data corpus one or more metatags through execution of a ranking function, wherein said ranking function is controllable through a parameter value;
   selecting a first subset of members from said data corpus whose associated metatags are a match to a first set of criteria;
   processing said first subset of members to produce a set of pairwise associations between elements of each of said first subset of members;
   selecting a subset of said set of pairwise associations that reach a certain predefined or preset value;
   identifying a second subset of members from said data corpus based on said subset of said pairwise associations;
   computing a utility function to measure a utility of said second subset of members;
   adjusting said parameter value to an adjusted parameter value based on said utility function;
   associating one or more members of said data corpus with one or more retrospective metatags through execution of said ranking function controlled by said adjusted parameter value; and
   selecting a third subset of members from said data corpus whose associated metatags are a match to a second set of criteria.

2. The method of claim 1, wherein said one or more metatags describe content of a respective member of said data corpus.

3. The method of claim 1, wherein said one or more metatags represent one or more concept classes contained in a respective member of said data corpus.

4. The method of claim 3, wherein said one or more concept classes are inferred through the presence of one or more feature vectors in one or more respective members of said data corpus.

5. The method of claim 1, wherein said first set of criteria are selected by a user.

6. The method of claim 1, wherein said pairwise associations are pairwise associations between concepts and further comprising the step of calculating a value, for each pairwise association, representative of the number of times that each respective pairwise association occurs across said second subset of members.

7. The method of claim 1, wherein said elements are nouns and/or noun phrases.

8. The method of claim 1, further comprising the steps of:
generating a second set of pairwise associations between elements of said third subset of members; and
calculating a value, for each pairwise association, representative of the number of times that each respective pairwise association occurs across said third subset of members.

9. The method of claim 8, further comprising the step of changing said first set of criteria to said second set of criteria based on said utility function.

10. The method of claim 8, wherein said elements are nouns and/or noun phrases and further comprising the step of identifying pairwise associations having a respective said value reaching a predetermined threshold.

11. The method of claim 10, further comprising the step of extracting elements of said third subset of members associated with said identified pairwise associations having a respective said second value reaching said predetermined threshold.

12. A method for performing knowledge discovery, the method comprising the steps of:
determining a first degree of correlation among a data corpus;
metatagging members of said data corpus with metatags according to a metatagging scheme, wherein said metatagging scheme employs a first level of knowledge representation for said first degree of correlation and employs at least a second level of knowledge representation for a second degree of correlation among data, wherein said step of metatagging is controllable through a parameter value, and wherein said first and second levels of knowledge representation are representative of different degrees of correlation among data;
determining said second degree of correlation among a first subset of said data corpus;
identifying a second subset of members from said data corpus based on said second degree of correlation among said first subset of said data corpus;
computing a utility function to measure a utility of said second subset of members;
adjusting said parameter value to an adjusted parameter value based on said utility function;
remetatagging said members of said data corpus with metatags according to said metatagging scheme, wherein said step of remetatagging is controlled through said adjusted parameter value and;
selecting a third subset of members from said data corpus whose associated metatags are a match to a first set of criteria.

13. The method of claim 12, further comprising the step of selecting said first subset of members from said data corpus whose metatags are a match to a second set of criteria.

14. The method of claim 13, further comprising the step of selecting a second subset of said data corpus whose metatags are a match to said second set of criteria.

15. The method of claim 12, wherein said step of determining a first degree of correlation comprises the step of identifying one or more concept classes contained in a respective member of said data corpus.

16. The method of claim 12, wherein said step of determining a first degree of correlation comprises the step of generating a set of pairwise associations of nouns and/or nouns phrases between elements of said first subset of members.

17. The method of claim 16, further comprising the step of calculating a value, for each pairwise association, representative of the number of times that each respective pairwise association occurs across said first subset of members.

18. The method of claim 12, wherein said step of determining a first degree of correlation comprises the step of generating a set of subject noun-verb-object noun associations drawn from a portion of said data corpus.

19. The method of claim 12, wherein said step of determining a first degree of correlation comprises the step of identifying context associations across a portion of said data corpus.

20. The method of claim 15, wherein said step of determining said second degree of correlation comprises the step of generating a set of pairwise associations of nouns and/or nouns phrases between elements of said first subset of members.

21. The method of claim 20, further comprising the step of calculating a value, for each pairwise association, representative of the number of times that each respective pairwise association occurs across said first subset of members.

22. The method of claim 12, wherein said step of determining said second degree of correlation comprises the step of generating a set of subject noun-verb-object noun associations drawn from a portion of said data corpus.

23. The method of claim 12, wherein said step of determining said second degree of correlation comprises the step of identifying context associations across a portion of said data corpus.

24. The method of claim 12, wherein said step of determining said second degree of correlation comprises the step of identifying semantic associations across a portion of said data corpus.

25. The method of claim 12, wherein said first level of knowledge representation is associated with a category of data selected from the group consisting of: nouns and/or nouns phrases, noun-verb-object noun associations, context associations, or semantic associations.

26. The method of claim 25, wherein said second level of knowledge representation is associated with a category of data selected from the group consisting of: noun-verb-object noun associations, context associations, or semantic associations.

27. The method of claim 25, wherein said second level of knowledge representation is associated with a higher level of abstraction than said first level of knowledge representation.

28. The method of claim 1, wherein said third subset of members is greater in number than said first set of members.

29. The method of claim 1, wherein one or more members of said data corpus are images.

30. The method of claim 1, wherein said parameter value comprises a vector of parameters.

31. The method of claim 1, further comprising the step of calculating a value, for each pairwise association, representative of the number of times that each respective pairwise association occurs across said first subset of members.

32. The method of claim 12, wherein said step of determining a first degree of correlation comprises the step of generating a set of pairwise associations of concepts between elements of said first subset of members.

33. The method of claim 32, further comprising the step of calculating a value, for each pairwise association, representative of the number of times that each respective pairwise association occurs across said first subset of members.

* * * * *